United States Patent [19]

Rozeboom

[11] 4,396,330
[45] Aug. 2, 1983

[54] HAY BALE RETRIEVER

[75] Inventor: Tunis J. Rozeboom, Zeeland, Mich.

[73] Assignee: Donald Disselkoen, Zeeland, Mich.

[21] Appl. No.: 278,515

[22] Filed: Jun. 29, 1981

[51] Int. Cl.$^3$ ............................................. A01D 87/12
[52] U.S. Cl. ................... 414/24.5; 198/517;
198/520; 414/491; 414/538; 414/911
[58] Field of Search ............ 414/24.5, 24.6, 491,
414/492, 493, 538, 539, 559, 911; 198/517, 520,
740

[56] References Cited

U.S. PATENT DOCUMENTS

| 2,747,886 | 5/1956 | Lee. | |
|---|---|---|---|
| 2,785,763 | 3/1957 | Stump. | |
| 2,911,118 | 11/1959 | Tapp. | |
| 3,013,676 | 12/1961 | Daniels, Jr. | |
| 3,885,686 | 5/1975 | Siebring. | |
| 3,944,095 | 3/1976 | Brown. | |
| 3,951,288 | 4/1976 | Hale et al. | 414/491 |
| 3,971,484 | 7/1976 | Anderson et al. | |
| 4,053,070 | 10/1977 | Rozeboom | 414/24.5 X |
| 4,056,204 | 11/1977 | Spasuik | 414/24.5 X |
| 4,321,004 | 3/1982 | Mills | 414/491 X |

FOREIGN PATENT DOCUMENTS 2412498 8/1979 France ................................. 414/24.5
433193 8/1935 United Kingdom ................. 198/517

OTHER PUBLICATIONS

Brochure Entitled "Model 85 Bale Handler", pp. E-1 through E-5.

Primary Examiner—Leslie J. Paperner
Attorney, Agent, or Firm—Price, Heneveld, Huizenga & Cooper

[57] ABSTRACT

Apparatus for retrieving round hay bales includes a frame, an elongated, rigid and generally U-shaped pan supported on said frame and a generally U-shaped bail. A pair of carriages are slidably supported on the pan and the legs of the bail are pivoted to the carriages. An endless driven chain shifts the carriages and the bail longitudinally of the pan. A drive operatively engages the bail to pivot the bail through an angle of approximately 180°. The frame is tiltable so that a forward open end of the pan may be positioned at ground level immediately adjacent a round hay bale. The U-shaped bail may be disposed around the hay bale and the carriages shifted so that the hay bale is pulled onto the elongated pan.

19 Claims, 8 Drawing Figures

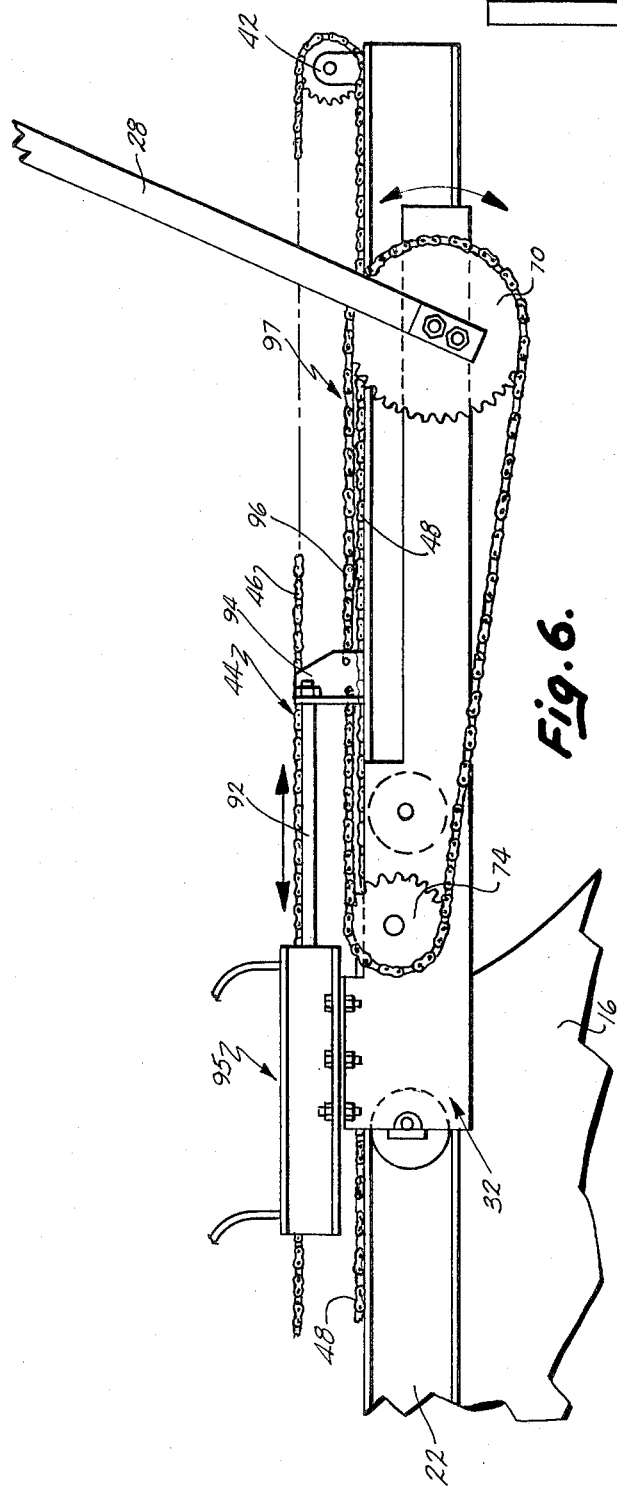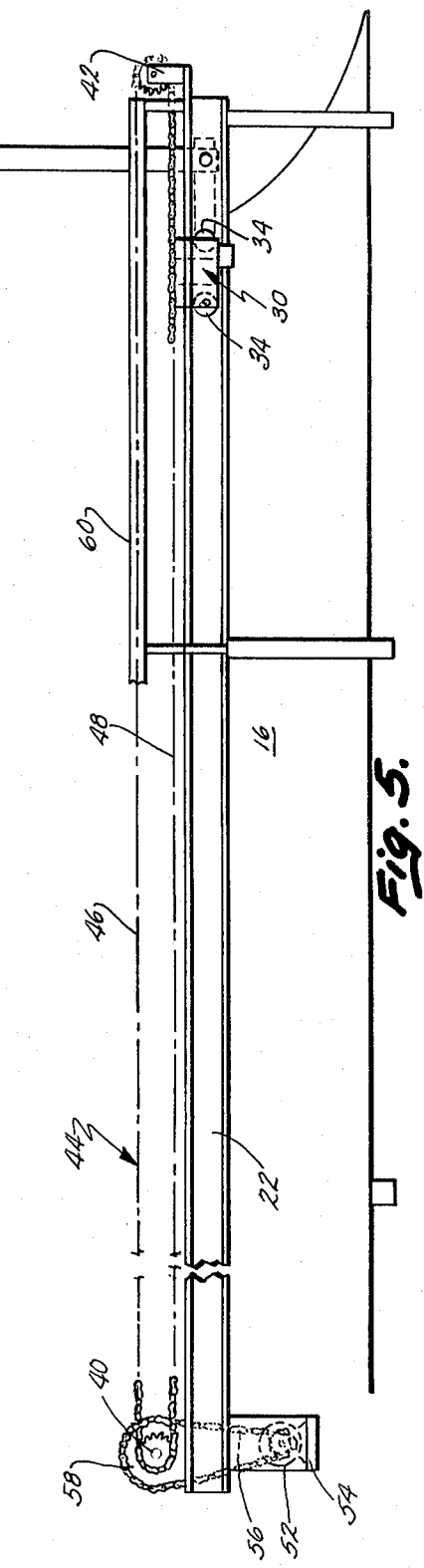

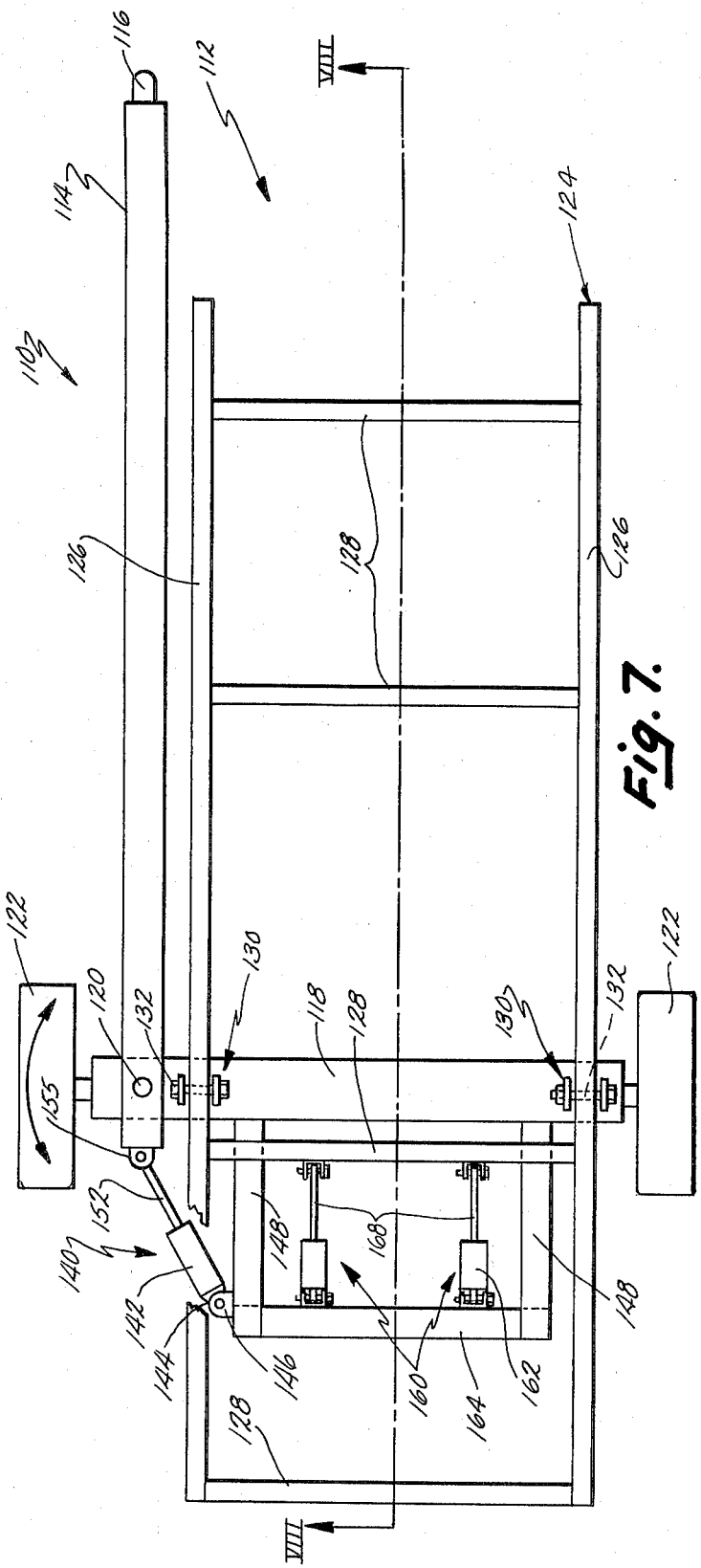
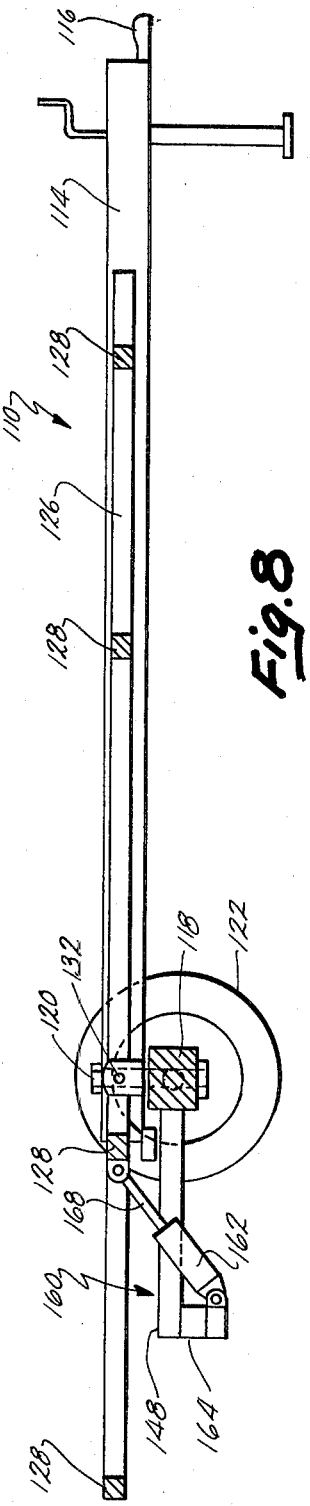

HAY BALE RETRIEVER

BACKGROUND OF THE INVENTION

The present invention relates to apparatus for harvesting hay and more particularly to a unique device for retrieving and transporting round hay bales.

Relatively recently hay baling operations have been employed which form round hay bales. These bales are approximately four to eight feet in diameter and possess significant advantages over the more conventional or regular rectangular shaped bales. A large round hay bale may be the equivalent of 22 to 25 regular rectangular bales. Further, round bales can be stored outside year after year, if necessary, without suffering adverse consequences. The round or cylindrical bales are usually held together by circumferential strands of twine and shed water. These bales, therefore, do not rot as square bales do when left in the field.

The round bales usually have been removed from the field through the use of a forklift and a tractor-hauled wagon. The forklift can damage the round hay bales. Also, such prior methods are labor intensive and, of course, require the use of a minimum of two vehicles.

U.S. Pat. No. 4,053,070, entitled RETRIEVING VEHICLE and issued on Oct. 11, 1977, in the name of the present inventor discloses a unique retrieving vehicle which is capable of retrieving round hay bales and transporting them to a place of storage or use. The vehicle disclosed therein is self-propelled and includes an elongated frame supporting a deck or pan structure. The deck includes a pivotable, forward ramp portion which may be lowered to ground level. A bail unit is provided which includes legs pivotally connected to carriers slidably mounted on tracks supported by the deck. The bail at its forward end includes wheels which ride on the track defined by the ramp portion. The bails move longitudinally of the frame through a sprocket and chain arrangement. The hay bales are loaded at the forward ramp portion and unloaded by being pushed off the vehicle at the rear thereof.

SUMMARY OF THE INVENTION

In accordance with the present invention, a unique retrieval vehicle is provided which permits round hay bales to be retrieved along their longitudinal axes and which permits the bales to be offloaded at the forward end of the vehicle. Essentially, the apparatus includes a frame supporting an elongated deck or pan structure. A generally U-shaped bail is pivotally secured to carriages or trolleys which are adapted for movement longitudinally of the deck or pan. Provision is made for positively rotating the bail from an inoperative to an operative position at which it can engage a round hay bale and pull the bale onto the pan. Since the bail is pivotable, the hay bales may be offloaded from the forward end of the vehicle. In narrower aspects, the ramp portion heretofore employed is eliminated, and the entire pan is tilted for loading or unloading.

BRIEF DESCRIPTION OF THE DRAWINGS

FIG. 5 is a side, elevational view of a portion of the hay bale retriever;

FIG. 6 is an enlarged, fragmentary, side elevational view of an alternative means for rotating the bail;

FIG. 7 is a top, plan view of a trailer adapted to support the bale retrieving apparatus in accordance with the present invention; and FIG. 8 is a side, elevational view in cross section of the trailer taken along line VIII—VIII of FIG. 7.

DETAILED DESCRIPTION OF THE PREFERRED EMBODIMENT

Figure 1:
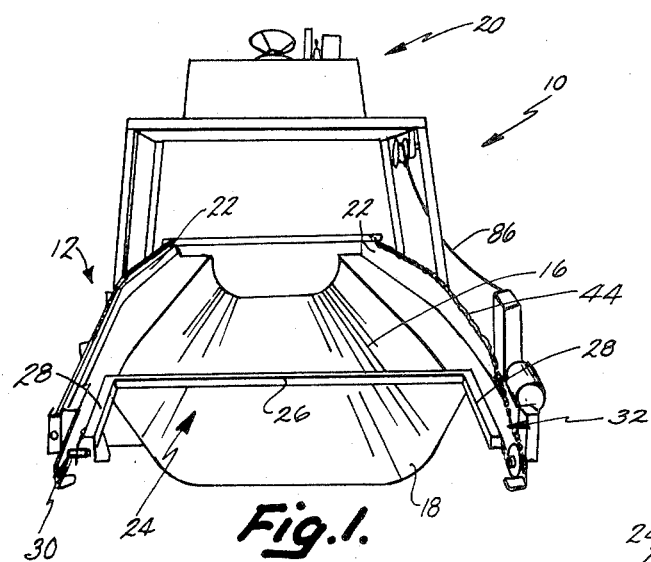
FIG. 1 is a front, perspective view of a retrieval vehicle in accordance with the present invention.
Figure 2:
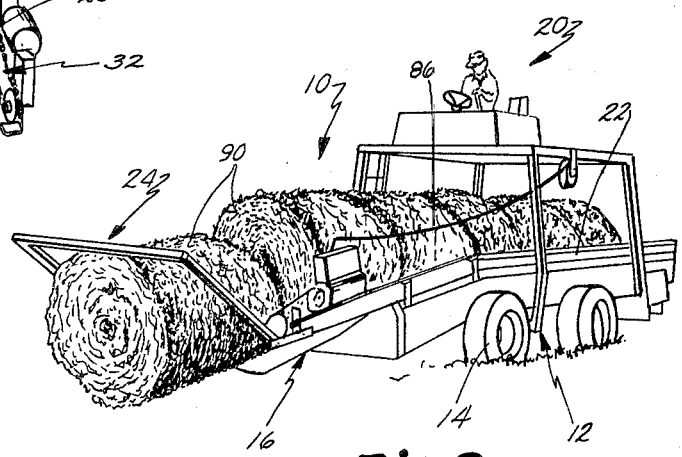
FIG. 2 is a side, perspective view of the retrieval vehicle.
Figure 3:
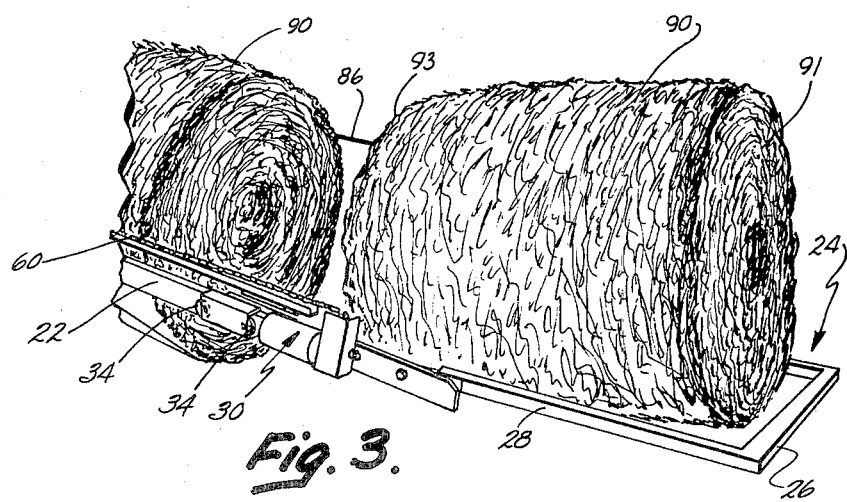
FIG. 3 is an enlarged, fragmentary view showing the positioning of the bail about a round hay bale.

A preferred embodiment of the hay bale retrieval apparatus in accordance with the present invention is illustrated in FIGS. 1 and 2 and generally designated 10. Apparatus 10 is a self-propelled device including a truck frame structure generally designated 12 to which ground engaging wheels 14 are secured. Supported on frame 12 is an elongated deck or pan 16. Pan 16 is rigid and generally U-shaped in cross section. Pan 16 includes an open forward end 18. Supported from the truck frame 12 is an operator station generally designated 20. Operator station 20 includes conventional controls for starting, stopping and directing self-propelled vehicle 10. As explained in more detail below, vehicle 10 includes elongated tracks generally designated 22 which extend along the lateral edges of pan or deck 16. Supported on tracks 22 is a generally U-shaped bail 24. Bail 24 includes a base 26 which is joined to legs 28. Legs 28 are pivotally secured to trolleys, carriers or carriages 30, 32. As seen in FIG. 3, trolley 30 extends around its respective track 22 and includes wheels 34 which ride within a channel portion defined by the track.

Figure 4:
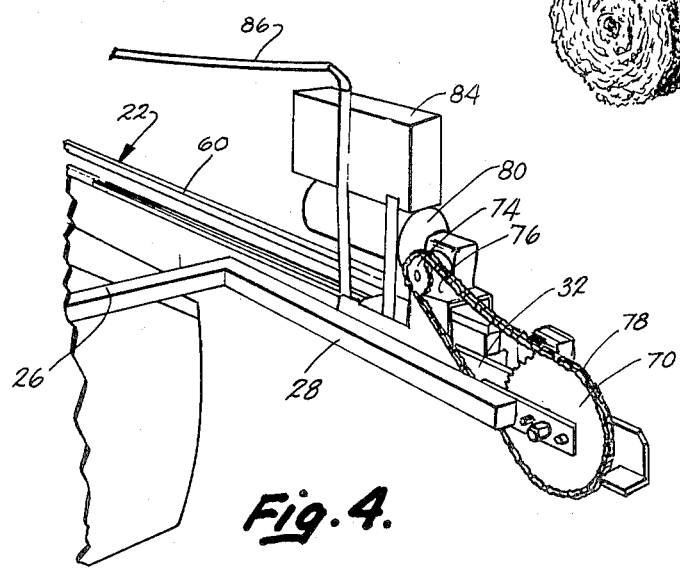
FIG. 4 is an enlarged view of means for rotating the bail.

As best seen in FIGS. 4 and 5, provision is made for shifting each carriage 30, 32 longitudinally on its respective track. In the embodiments illustrated, each track includes sprockets 40, 42 about which an endless chain 44 extends. The chain includes an upper run 46 and a lower run 48. Each trolley 30, 32 is connected to links of the lower run 48. As shown in FIG. 5, sprockets 40 are operatively connected to a drive motor 52 supported on a bracket 54. Motor 52 through a chain 56 and driven sprocket 58 rotates sprockets 40. Tracks 22 also support chain guards 60 above their upper surfaces. The chain guards are generally U-shaped in cross section and the upper runs 46 of the respective chains 44 ride within the guards 60.

In the embodiment illustrated in FIGS. 1-4, provision is made for rotating the bail 24 through an angle of approximately 180°. As seen in FIG. 4, one leg 28 of the bail is secured to a driven sprocket 70. Driven sprocket 70 is rotatably supported on carriage 32 by a suitable stub shaft 72. A drive sprocket 74 is rotatably supported on carriage 32 by a bracket 76. An endless chain 78 extends around sprockets 70, 74. A motor 80 has an output shaft which is operatively connected to sprocket 74. In the embodiment illustrated, motor 80 is an electric motor connected to suitable batteries 84. A cord 86 runs from the motor structure to the operator control station. As should be apparent, actuation of motor 80 in a forward or reverse direction will result in rotation of the bail through an angle of at least 180°.

As shown in FIGS. 2 and 3, the retrieval vehicle 10 may be driven up to a round hay bale 90 at an end face thereof. With the forward end of the deck or pan at ground level, the bail 24 may be rotated about a hay bale 90 and positioned at a front face 91 thereof. This is shown in FIG. 3, for example. Upon actuation of motor 52, the carriages will be shifted rearwardly of the deck. The transverse base member 26 of the bail will engage a forward face of the round hay bale and pull the hay bale onto the deck. The front end of the deck is raised through any suitable means such as piston/cylinder units (not shown) and the vehicle can continue its retrieval operation or transport the retrieved round hay bales to a suitable storage location. To unload, the bail is rotated so that base 26 contacts a rear face 93 of bale 90. The carriages are actuated and the bale is pushed off the front end of the deck.

The self-propelled vehicle 10 illustrated in FIGS. 1 and 2 gently slides the round hay bales on and off the vehicle with the same side of the bale always in a down position. This eliminates any unwanted shake up or destruction of the bales which can happen when using a forklift or when the bales are rolled onto a retrieval vehicle. The vehicle is capable of picking up seven bales, or the equivalent of 150 to 175 squares bales, from a field in a five minute period. These can be unloaded for storage within one minute by a single person. The self-propelled vehicle, therefore, represents a significant savings to the hay baler.

FIG. 6 illustrates an alternative embodiment of a device for rotating the retrieval bail means 24. As shown therein, the alternative structure includes a piston/cylinder actuator 95. Piston/cylinder actuator 95 includes an extensible and retractable rod 92. Secured to the rod 92 is a bracket 94. Bracket 94 is connected to an upper run 96 of an endless chain 97 extending around the drive and driven sprockets 74, 70, respectively. Extension and retraction of rod 92 will result in rotation of the legs 28 of the bail so that the bail may be positioned about a hay bale. Piston/cylinder assembly 95 may be air or hydraulically operated.

FIGS. 7 and 8 illustrate an alternative retrieval vehicle generally designated 110. Vehicle 110 includes a trailer structure generally designated 112 which is adapted to be pulled by a tractor or the like. Trailer 112 includes an elongated beam member 114 supporting a tongue 116. An axle beam 118 is pivotally secured to member 114 by a pivot pin 120. Axle structure 118 rotatably supports ground engaging wheels 122. Pivotally supported on the axle beam 118 is a subframe structure generally designated 124. Subframe structure 124 includes elongated longitudinally extending members 126 and transverse members 128. Elongated members 126 are pivoted within brackets 130 supported on axle 118. Suitable pivot pins 132 extend through the brackets and the elongated subframe members 126.

As seen in FIG. 7, the axle 118 and hence the subframe 124 may be pivoted relative to pin 120 and elongated member 114 by a piston/cylinder actuator 140. Actuator 140 includes a cylinder 142 having an end 144 pivoted at a bracket 146 to one of a pair of frame members 148 which extend from and are secured to axle 118. Actuator 140 also includes a rod 152 having an end pivoted to a bracket 155 secured to member 114. As should be readily apparent, extension and retraction of the rod 152 will cause axle 118 to pivot about pivot pin 120. As a result, the operator of the tractor or other vehicle pulling the trailer may approach a bale and pivot the subframe 124 away from side member 114 into position at the face of a round bale for retrieval thereof.

The elongated pan 16 which supports the retrieved hay bales is mounted directly on the subframe 124. Provision is made for tilting the subframe 124 relative to the axle 118 so that a forward end of the pan may be positioned at ground level. As illustrated in FIGS. 7 and 8, suitable piston/cylinder actuators 160 include cylinders 162 pivoted to a cross piece 164 which is secured between frame members 148. The rods 168 of the actuators are pivoted to a cross piece 128 of the subframe 124. As should be readily apparent from FIG. 8, extension and retraction of the rods 168 will result in tilting or pivoting of the subframe 124 about pivot pins 132.

With the embodiment illustrated in FIGS. 7 and 8, it is presently preferred that the piston/cylinder actuators would be connected to a suitable hydraulic motor. The motor could be driven off the conventional "power take off" of the tractor which tows the trailer structure. Also, the motor employed to shift carriages 30 longitudinally of the deck on their respective tracks could be hydraulic and driven through the same source of hydraulic fluid.

The vehicle of FIGS. 7 and 8 would have a reduced or shorter deck length than the self-propelled structure illustrated in FIGS. 1 and 2. This vehicle would be more readily adaptable to smaller forming or hay baling operations. The basic configuration of the deck 16 and the means for rotating the bail 24, however, remain the same.

OPERATION

The vehicle of either embodiment is positioned at the rear face of a round hay bale 90. The forward end of the deck is dropped to ground level and the bail 24 is rotated into position at the front 91 of the bale. The carriages or trolleys 30, 32 are then actuated so that they move rearwardly of the vehicle. The vehicle may be moved forwardly simultaneously therewith to minimize sliding damage to the hay bale as it is pulled onto the deck structure. Each bale 90 retrieved is moved towards the rear of the vehicle, as illustrated in FIG. 2. The front of the deck is then raised and the vehicle moved into position at the next hay bale to be retrieved. The bales can be offloaded from the deck by rotating the bail 24 to a position at a rear face 93 of one of the round bales 90 positioned on the deck 16. The front end of the deck 16 could then be lowered to ground level and the carriages 30, 32 actuated so that they move towards the forward end of the vehicle. Simultaneously therewith the vehicle could be moved rearwardly to minimize sliding of the bales on the ground. In the alternative, the deck can also be provided with an open rear end. With the trailer structure illustrated in FIGS. 7 and 8, the rear end could be lowered or tilted to ground level and the bales could be pushed off the rear end of the trailer. The user is provided, therefore, with complete versatility in the manner of loading or offloading the bales. The front of the deck could also be raised so that bales are stacked on top of each other. This may be desirable if storage space is limited.

The hay bale retriever in accordance with the present invention insures that the bail may be accurately positioned around hay bales and the bales may be moved onto a deck longitudinally thereof. As a result, the bales are not rolled during loading and possible damage to the circumferential twine and the hay itself is eliminated or minimized. The same side of the bale is maintained in a down position throughout loading and unloading operations. The basic construction of the bale retriever is readily adaptable to a self-propelled configuration by mounting on a conventional truck frame or it may be mounted on a trailer structure. Significant savings in labor and equipment expense are realized through use of the present invention.

In view of the foregoing description, those of ordinary skill in the art will undoubtedly envision various modifications which would not depart from the inventive concepts disclosed herein. For example, the endless chain 96 and sprockets 70, 74 could be replaced by a pulley and belt arrangement. Further, the basic configuration of the pan could be varied from the curvilinear, generally U-shaped configuration illustrated. Therefore, it is expressly intended that the above description should be considered as that of the preferred embodiment. The true spirit and scope of the present invention may be determined by reference to the appended claims.

The embodiments of the invention in which an exclusive property or privilege is claimed are defined as follows:

1. Apparatus for retrieving hay bales, comprising:
 a frame;
 an elongated generally U-shaped pan supported on said frame, said pan including an open forward end and an open rear end;
 a carriage supported on said frame;
 means connected to said carriage for moving said carriage along said pan;
 a U-shaped bail having legs joined to a base, said legs being pivoted to said carriage; and
 drive means operatively connected to said bail for positively rotating said bail through an angle of approximately 180° so that said bail may be moved around a hay bale to pull said hay bale onto said pan upon movement of said carriage and so that said bail may be moved around a hay bale on said pan to push said hay bale off the forward end of said pan, said drive means including driven means supported on said carriage and operatively connected to one of said legs of said bail.

2. Apparatus as defined by claim 1 further including: a trailer, said frame being secured to said trailer.

3. Apparatus as defined by claim 2 wherein said trailer includes:
 an elongated member;
 an axle pivoted adjacent one end to said member;
 ground engaging wheels rotatably mounted on said axle; and
 pivot means between said member and said axle for pivoting said axle with respect to said member.

4. Apparatus as defined by claim 3 further including:
 tilt means between said trailer and said frame for tilting said frame about said axle so that the forward end of said pan may be lowered to ground level.

5. Apparatus as defined by claim 1 further including:
 ground engaging wheels rotatably supporting said frame.

6. Apparatus for retrieving hay bales, comprising:
 a frame;
 an elongated generally U-shaped pan supported on said frame, said pan including an open forward end;
 a carriage supported on said frame;
 means connected to said carriage for moving said carriage along said pan;
 a U-shaped bail having legs joined to a base, said legs being pivoted to said carriage; and
 drive means operatively connected to said bail for positively rotating said bail so that said bail may be moved around a hay bale to pull said hay bale onto said pan upon movement of said carriage, said drive means comprising:
 a driven sprocket supported on said carriage, one of said legs being fixed to said driven sprocket; and
 a motor operatively connected to said driven sprocket for rotating said sprocket.

7. Apparatus for retrieving hay bales, comprising:
 a frame;
 an elongated generally U-shaped pan supported on said frame, said pan including an open forward end;
 a carriage supported on said frame;
 means connected to said carriage for moving said carriage along said pan;
 a U-shaped bail having legs joined to a base, said legs being pivoted to said carriage; and
 drive means operatively connected to said bail for positively rotating said bail so that said bail may be moved around a hay bale to pull said hay bale onto said pan upon movement of said carriage, said drive means comprising:
 a drive sprocket rotatably mounted on said carriage;
 a driven sprocket rotatably mounted on said carriage, one of said legs of said bail being fixed to said driven sprocket;
 endless force transmission means extending around said sprockets; and
 motor means for shifting said transmission means to rotate said driven sprocket.

8. Apparatus as defined by claim 7 wherein said motor means comprises:
 a piston/cylinder actuator having a rod fixed to said force transmission means.

9. Apparatus as defined by claim 7 wherein said motor means comprises:
 a rotary motor having an output shaft connected to said drive sprocket for rotating same.

10. Apparatus as defined by claim 8 wherein said endless force transmission means is an endless chain.

11. Apparatus as defined by claim 9 wherein said endless force transmission means is an endless chain.

12. Apparatus for retrieving hay bales, comprising:
 a frame;
 an elongated generally U-shaped pan supported on said frame, said pan including an open forward end;
 a carriage supported on said frame;
 means connected to said carriage for moving said carriage along said pan;
 a U-shaped bail having legs joined to a base, said legs being pivoted to said carriage;
 drive means operatively connected to said bail for positively rotating said bail so that said bail may be moved around a hay bale to pull said hay bale onto said pan upon movement of said carriage; and
 a trailer, said frame being secured to said trailer, said trailer including:
 an elongated member;
 an axle pivoted adjacent one end to said member;
 ground engaging wheels rotatably mounted on said axle;
 pivot means between said member and said axle for pivoting said axle with respect to said member; and
 tilt means between said trailer and said frame for tilting said frame about said axle so that the forward end of said pan may be lowered to ground level, and wherein said drive means comprises:
 a drive sprocket rotatably mounted on said carriage;

a driven sprocket rotatably mounted on said carriage, said leg of said bail being fixed to said driven sprocket;

endless force transmission means extending around said sprockets; and motor means for shifting said transmission means to rotate said driven sprocket.

13. Apparatus as defined by claim 12 wherein said motor means comprises:

a piston/cylinder actuator having a rod fixed to said force transmission means.

14. A hay bale retrieval vehicle for retrieving round hay bales, said vehicle comprising:

a frame;

a pair of ground engaging wheels rotatably supported on said frame;

means connected to said frame for tilting said frame about said wheels;

an elongated deck secured to said frame, said deck having lateral edges;

a pair of elongated tracks, each track extending along one of said lateral edges of said deck;

a pair of trolleys, each trolley being received by one of said tracks for movement therealong;

drive means operatively connected to said trolleys for moving said trolleys along said tracks;

a generally U-shaped member having a pair of legs joined to a base, each of said legs being pivoted to one of said trolleys; and actuator means on one of said trolleys and operatively connected to one of said legs for rotating said member through an angle of approximately 180°.

15. A hay bale retriever as defined by claim 14 wherein said actuator means comprises:

a drive sprocket rotatably mounted on said one of said trolleys;

a driven sprocket rotatably mounted on said one of said trolleys, said one of said legs being fixed to said driven sprocket; and an endless chain extending around said sprockets.

16. A hay bale retriever as defined by claim 15 wherein said actuator means further comprises:

a motor having an output shaft connected to said drive sprocket.

17. A hay bale retriever as defined by claim 15 wherein said actuator means further comprises:

a piston/cylinder actuator mounted on said one of said trolleys and having a rod secured to a run of said endless chain.

18. A hay bale retriever as defined by claim 17 wherein said frame comprises:

an elongated member;

an axle supporting said wheels;

pivot means for pivoting said axle with respect to said elongated member;

deck support means for pivotally mounting said deck to said axle for rotation about an axis transverse to said deck; and tilt means engaging said deck support means for tilting said deck about said axis so that a forward end of said deck may be positioned at ground level.

19. A hay bale retriever as defined by claim 17 further comprising:

propulsion means connected to said wheels for driving said wheels.

* * * * *